(No Model.)

R. H. RICKER
MECHANICAL TOY.

No. 271,273. Patented Jan. 30, 1883.

WITNESSES
Helen M. Treegan
Frank J. Parker

INVENTOR
Reuben H. Ricker

UNITED STATES PATENT OFFICE.

REUBEN H. RICKER, OF BOSTON, MASSACHUSETTS.

MECHANICAL TOY.

SPECIFICATION forming part of Letters Patent No. 271,273, dated January 30, 1883.

Application filed June 12, 1882. (No model.)

*To all whom it may concern:*

Be it known that I, REUBEN H. RICKER, of Boston, in the county of Suffolk and State of Massachusetts, have invented certain new and useful Improvements in Mechanical Toys, of which the following is a specification.

The object of my invention is to cause a number of images mounted upon a toy wagon to perform certain amusing acts. This object I attain by the mechanism illustrated in the accompanying drawings, in which—

Figure 1:
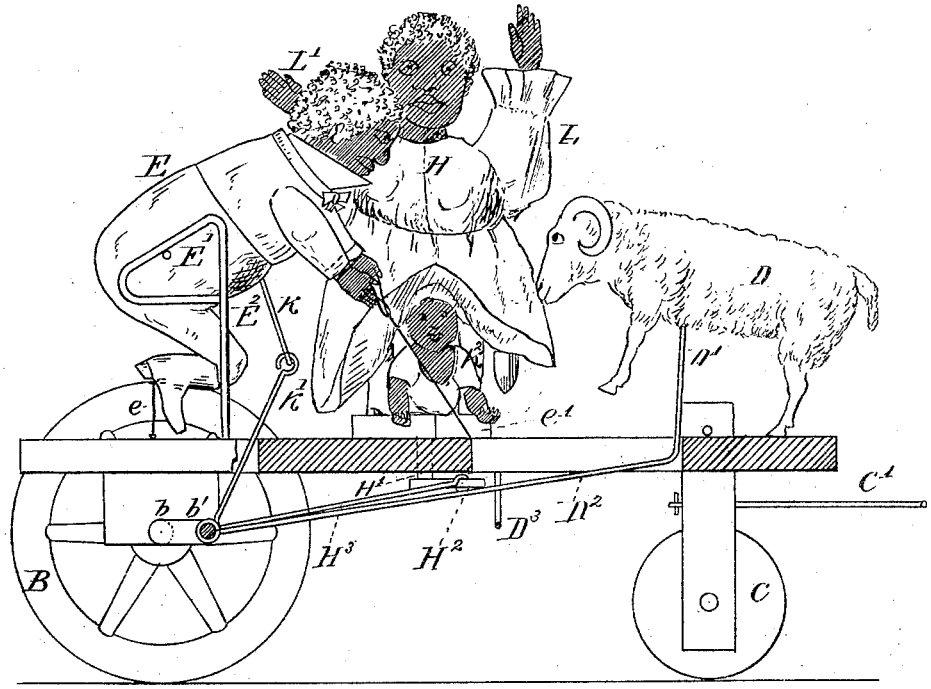
Figures 2, 3:
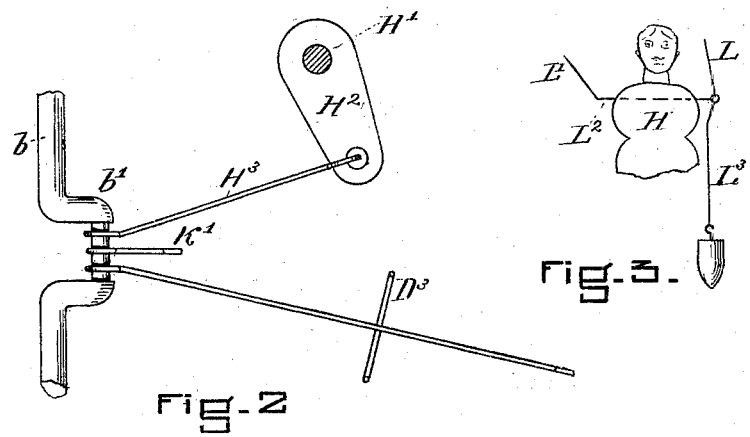

Figure 1 shows, mostly in elevation, my invention, the parts being shown in section to illustrate more clearly the mechanical movement. Figs. 2 and 3 are details to illustrate the method of transmitting motion.

Let A represent the body or platform of a toy wagon, mounted upon small wheels B and C and provided with a draft-tongue, C'. Upon the platform A, I place the image of an animal, D, also three images, E H K, representing respectively a man, woman, and child.

The image E, representing a man in the act of butting the animal B, is held loosely in place by means of pins E' on each side of him, which are allowed to move within triangles formed by the wire $E^2$. (See Fig. 1.) These wires $E^2$ also serve to hold the image laterally.

$e$ $e'$ are elastic cords, one of which, $e$, attaches the feet to the platform A, while the the cord $e'$ connects the hands to the platform A. These elastic cords $e$ $e'$ admit of considerable movement of the image E. Positive motion is communicated to the image E by the lever K', the lower end of which is connected to the crank-shaft B B', (see Figs. 1 and 2,) while the upper end is connected to a stiff projecting wire, K, Fig. 1. As the crank-shaft $b$ $b'$ revolves with the wheels B, it is evident that at each revolution of the wheels the image E will act.

The image H is supported upon an oscillating peg, H', Fig. 2, which passes through the platform A. This peg H' is connected by a crank-arm, $H^2$, and link $H^3$ to the crank $b'$, so that at each revolution of the crank-shaft the image H acts.

The image $K^2$, representing a child, is attached indirectly to the peg H', so that it partakes of the motion of the image H. The arms L L' of the image H (see Figs. 1 and 3) are connected by a cross-wire, $L^2$, Fig. 3, and to a swinging weight, $L^3$, so that as the swinging weight $L^3$ vibrates it will give a corresponding motion to the arms L L'.

The animal D is attached by a bent rod, D' $D^2$, to the crank $b'$, so as to partake of its motion. To give the image D a vertical movement in connection with its forward-and-back movement, I place a wire staple, $D^3$, Figs. 1 and 2, under the platform A, so that it may act as a fulcrum for the bent rod D' $D^2$ to work on. As all of the images are connected to the same crank, $b'$, these motions will all occur in proper time.

I claim—

1. In a mechanical toy, the combination of the image E, pins E', guide $E^2$, and cords $e$ $e'$, with the projecting wire K, lever K', crank-shaft $b$ $b'$, and wheels B, all operating together, substantially as described and for the purpose set forth.

2. In a mechanical toy, the combination of the image H, peg H', crank-arm $H^2$, rod $H^3$, and crank-shaft $b$ $b'$, with the arms L L' and swinging weight $L^3$, all operating together, substantially as described, and for the purpose set forth.

REUBEN H. RICKER.

Witnesses:
HELEN M. FEEGAN,
WILLIAM EDSON.